United States Patent [19]

Geisler et al.

[11] 4,186,873

[45] Feb. 5, 1980

[54] HUMIDITY CONTROL SYSTEM AND CIRCUITRY

[75] Inventors: Russell W. Geisler, 31100 Hunters Dr., Farmington Hills, Mich. 48018; Walter H. Geisler, New Orleans, La.

[73] Assignees: Russel W. Geisler; Joseph C. Pansing, both of Farmington Hills, Mich.

[21] Appl. No.: 899,802

[22] Filed: Apr. 25, 1978

[51] Int. Cl.$^2$ .................. B01F 3/02; G05D 21/00
[52] U.S. Cl. .................. 236/44 A; 236/51; 340/310 A; 361/178
[58] Field of Search .......... 236/44 R, 44 A, 51; 307/118, 40; 361/178; 165/21; 340/310 A, 310 R, 538

[56] References Cited

U.S. PATENT DOCUMENTS

| | | | |
|---|---|---|---|
| 3,283,316 | 11/1966 | Beardmore et al. | 340/310 R |
| 3,840,176 | 10/1974 | Baysinger | 236/44 R |
| 3,972,471 | 8/1976 | Ziegler | 236/51 |
| 4,024,528 | 5/1977 | Boggs et al. | 340/310 A |

Primary Examiner—William E. Wayner
Attorney, Agent, or Firm—Dale Austin Winnie

[57] ABSTRACT

A wireless form of humidity control for residential and other uses and comprising; a carrier current type of transmitter and receiver used in combination and within a conventional electrical wiring system for a building, said transmitter including a step-down transformer and a humidity sensing device disposed in compact and close proximity and with the latter provided in the power supply line for said transformer for intermittent actuation of said transformer and consequent minimal heat generation therefrom, said transmitter and receiver having an operating frequency of at least half again that of the carrier wiring and said receiver having capacitance in the signal receptive connections thereto sufficient to provide an impedance low enough to pass a given high frequency signal and high enough to block the line potential frequency and variations incident thereto.

4 Claims, 4 Drawing Figures

HUMIDITY CONTROL SYSTEM AND CIRCUITRY

BACKGROUND OF THE INVENTION

For several years a system has been manufactured and marketed for inducing and controlling the moisture content in the atmosphere within a residential dwelling of other building. And the basic principle employed in such systems in generally well known and commonly referred to as "humidification" with the apparatus that is used called a "humidifier" by the heating and air conditioning industry.

The value of proper humidity control, of course, is especially beneficial to personal comfort in areas which have long winters, where a prolonged heating period is necessary, and in dry climates, where dry air exsists. The medical profession has long recognized and endorsed the health value of controlled moisture content in the local environment and, accordingly, the perfection of means and methods for better control thereof are highly sought after.

The usual system consists of a water reservoir (which is best known as mounted in the plenum of a warm air furnace) with the water level controlled by a relatively simple float valve connected to a convenient water source. Partly immersed in the water reservoir is a motor driven drum of polyureathane material. This material is used mostly because it exhibits high capillary attraction and affords a large area of evaporation with the flow of warm air currents over the surface of the polyureathane drum as it is rotated in the water bath. The warm air currents, of course, in turn introduce moisture into the ducts of the forced air heating system.

To control or meter the desired moisture level, a humidity sensing device, known as a humidistat, is usually mounted in a main trunk line duct or else it is located in a central living room or area of a residence to sense an average condition. The humidistat being, as will be appreciated, the counterpart of the well known thermostat.

The electrical requirements for operation of the humidifier system is normally a low voltage source (24 V., A.C) obtained from a transformer connected to the residence 117-120 V., A.C. wiring system. And, to make the system operational requires that low voltage control lines be interconnected between the transformer, the humidistat and the humidifier drum actuating motor. But the routing of these lines was and is complicated and results in considerable expense; particularly when installation is to be in an existing building. Labor costs, in fact, often exceed the cost of the basic product. Consequently, a "wireless" remote control system which would mean comparatively low cost installation and greater flexibility of control would be most beneficial.

Suitable wireless control systems would seem to include the "carrier current" types, radio frequency control systems, and ultra sonic means and methods.

Of these, the ultra sonic types are relatively expensive and, in addition, they have certain serious limitations. For example, their range is generally limited to the immediate area or room where both the control and the receiver are located. And while this is acceptable for an expensive color television set, the control being operated by the observer within sight of the set, and the cost not disproportionate to that of the television set, it is not suitable for operational control of a humidifier system which is itself relatively inexpensive and which may be located clear across the length of a house from where the control itself is disposed, or desired.

The radio frequency systems, particularly the low power radiation types, are commonly known as used with model boats, cars and airplanes and for garage door operation. However, while the control-transmitters are relatively simple, the receiver must be of a high gain type and it's therefor comparatively expensive. Also, both the control and receiver would require an antenna for radiation and reception of the signal. And, while such short comings could be accomodated, the location of the receiver in the area of the furnace duct work, which would also provide electro-magnetic shielding, would greatly attenuate the incoming signal and any adaptation necessary would add appreciably to the overall expense of the system in this form.

The carrier current type therefor appears to be the most appropriate from a cost standpoint and in that it is not susceptable to external influence; such as radiated spurious frequencies or noise, since the signal is confined and retained within the building wiring where used. The main problem and requirement is in selecting a frequency sufficiently far removed from the A.C. line frequency, and without harmonic interference, to assure compatability. Although a higher frequency requires an increased cost in the transistor used, it has been found that suitable transistors for operation of the proposed system, when properly designed, appear feasible at about $1.00 each, which is most nominal.

SUMMARY OF THE PRESENT INVENTION

The present invention relates to a humidity control system which provides close control of a humidifier, of a generally known type and design, including a drive motor, by means of a "carrier current" mode of transmitting a control signal over conventional electrical power wiring as in a house or other building.

This type of wireless control system employs a radio frequency signal (L.F. Band, 100 KH$_2$) which is transmitted through the electrical wiring and is capacitively de-coupled from the line and amplified in a manner which enables it to trigger a properly biased transistor circuit into a state of ready conduction. This resulting action, in turn, energizes an electro mechanical relay which is suitably adapted to control the humidifier motor.

The humidistat switch is particularly disposed to control the A.C. line to the transformer primary so that the transformer is only intermittently turned on and so that its temperature rise will not adversely effect the humidistat operations.

Control is obtained even with the transmitter on one side of the power distribution transformer in a 3 wire service into a residence, and the receiver on a circuit on the opposite side of the line transformer.

The control units can also be made so that they can be installed simply by plugging the line cords into convenient electrical outlet receptacles. To complete the installation, a low voltage (24 V.) two conductor line is all that is required for interconnecting the remote control receiver to the load, which is the humidifier motor. The receiver is normally in close proximity to the furnace mounted humidifier assembly, so only a short piece of direct open wiring is needed.

In addition, the humidity sensing control, which is the transmitter, can be plugged into any convenient outlet within a dwelling. This affords still further flexibility for the operation of the humidification system by allowing the user to determine the desirable comfort control in any given or selected room or area in a residence or building.

These and other objects and advantages to be gained in the practice of this invention will be better known and appreciated upon a reading of the detailed description of a preferred embodiment of the invention which follows hereinafter.

DESCRIPTION OF THE DRAWING FIGURES

DETAILED DESCRIPTION OF ILLUSTRATED EMBODIMENT

Figures 1, 2:
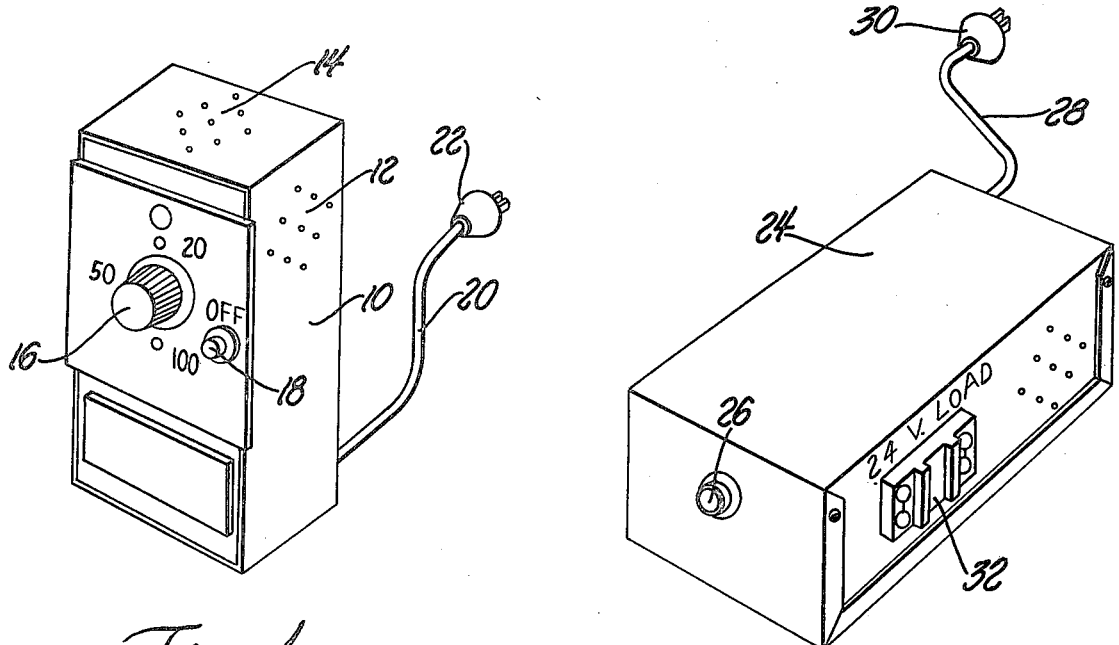
FIG. 1 is a perspective view of the humidity sensing device and transmitter of the present invention as it would appear ready to be plugged in for use.
FIG. 2 is a perspective view of the receiver device used in the present invention, ready for plug-in use and to be connected to the humidifier at or near the hot air furnace installation.

The remote control transmitter and sensing circuitry is of the printed circuit, solid state type, and it is housed within a box or casing 10 provided with appropriate vent holes 12 on the sides, and 14 on the top, and with a control knob 16, for selective humidity setting, and a pilot lamp 18 to indicate the "on-off" condition or state of the unit. A line cord 20, with a conventional 110 V. house line type plug 22 (or one of the grounded types) is also shown and will be appreciated as the means for connecting the transmitter into the house circuit whereby it obtains its "carrier current" wireless function.

The receiver circuit is similarly of the printed circuit, solid state type, and it is housed within a box or casing 24 that also has a pilot light 26 to indicate its "on-off" condition or state, and a line cord 28 with a conventional house line plug 30, or the grounded type, as desired. In addition, it has a terminal block 32 on one side by means of which connection can be made to the humidifier motor, as later shown and discussed.

In operational use, a fixed frequency of 100 $KH_z$ is superimposed on the A.C. line frequency of 60 $H_z$ for control purposes.

Figure 3:
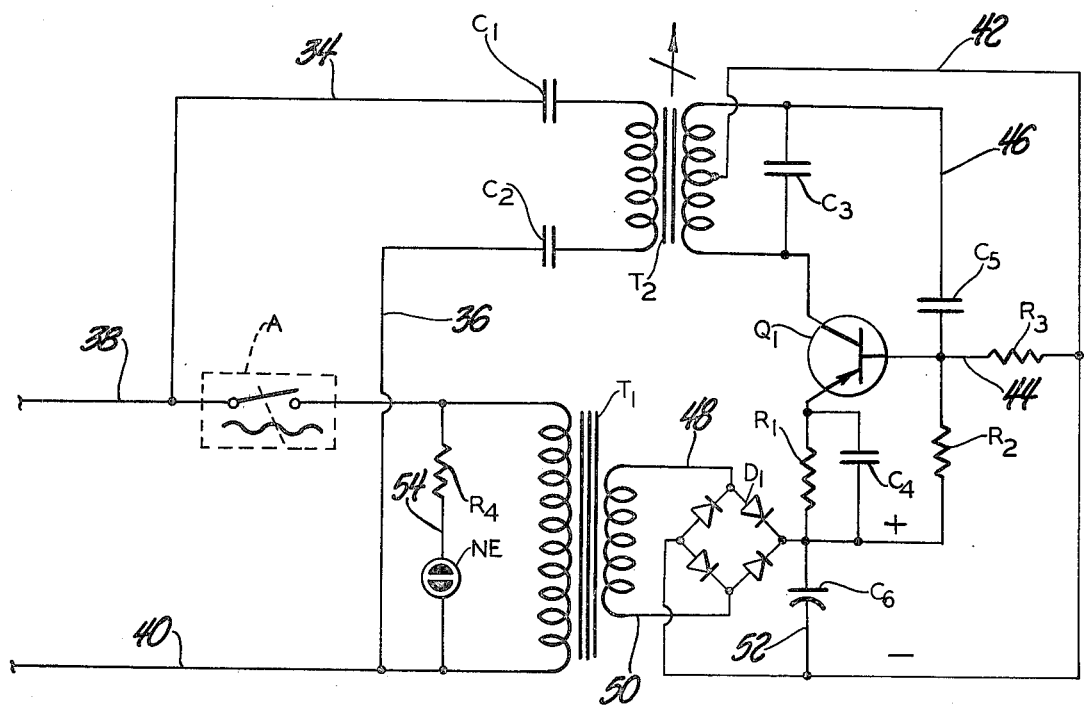
FIG. 3 is a schematic diagram of the humidity sensing and transmitting circuit.

Refering to FIG. 3, the control transmitter consists of a tuned collector oscillator for signal generation. Tuning is accomplished by permeability adjustment of the inductor $T_2$, which is an oscillator transformer, and has its one side connected by lines 34 and 36, through capacitors $C_1$ and $C_2$, each of the 0.1 uf., 250 V. peak type, to the house current lines 38 and 40, as via the power cord 20, and which provide the 117 V., 60 $H_z$, carrier current power source.

The "tank" coil of $T_2$ is tapped, as by line 42, to provide a tickler feed-back to the base of transistor $Q_1$, through resistor $R_3$, of 100 K Ohm, ¼ watt resistance, in line 44, and with capacitor $C_5$, of 140 uuf. 16 V.D.C., in line 46 used to sustain oscillation.

The output signal is inductively coupled by $T_2$ to the A.C. line, through capacitors $C_1$ and $C_2$, in order to provide a relatively low impedance (Z) at the 100 $KH_z$ frequency. At the A.C. line frequency, of 60 $H_z$, $C_1$ and $C_2$ present a high impedance, which serves to effectively isolate the output winding of $T_2$ from the line potential.

Circuit operation is obtained from a conventional power supply (namely the lines 38 and 40) which have the step down transformer $T_1$, which is a low voltage rectifier type, connected thereto (and which also serves to provide isolation from the line) and which has the secondary coil connected, as by lines 48 and 50, to the full wave diode bridge rectifier $D_{(4)}$. Filtering or reduction of "ripple" is provided by the capacitor $C_6$, of 100 uf. 16 V.D.C., in line 52, for the necessary D.C. output.

As will be appreciated, the instant "warm-up" of solid state circuits, in contrast to vacuum tube circuits, permits switching on-off at the power source for operation, on demand.

In this system the humidity sensor A, shown with the legend HUMIDISTAT and (H), is used for on-off operation of the transmitter unit. The contacts of the switch A being in series in the line 38 of the A.C. power source line, and with the transformer $T_1$. And a resistor $R_4$, of 100 K Ohm ⅛ watt resistance, together with an indicator light NE, or 18 as identified in FIG. 1, is provided in parallel, in line 54, to indicate the operative condition of the circuit.

The HUMIDISTAT, H, or A, will be appreciated as having a continuous and variable range of 20 to 100 percent humidity, as selected, or capable of selection by the control unit; it being appreciated that this is obtained by the knob control and manual adjustment is afforded for desired settings.

Figure 4:
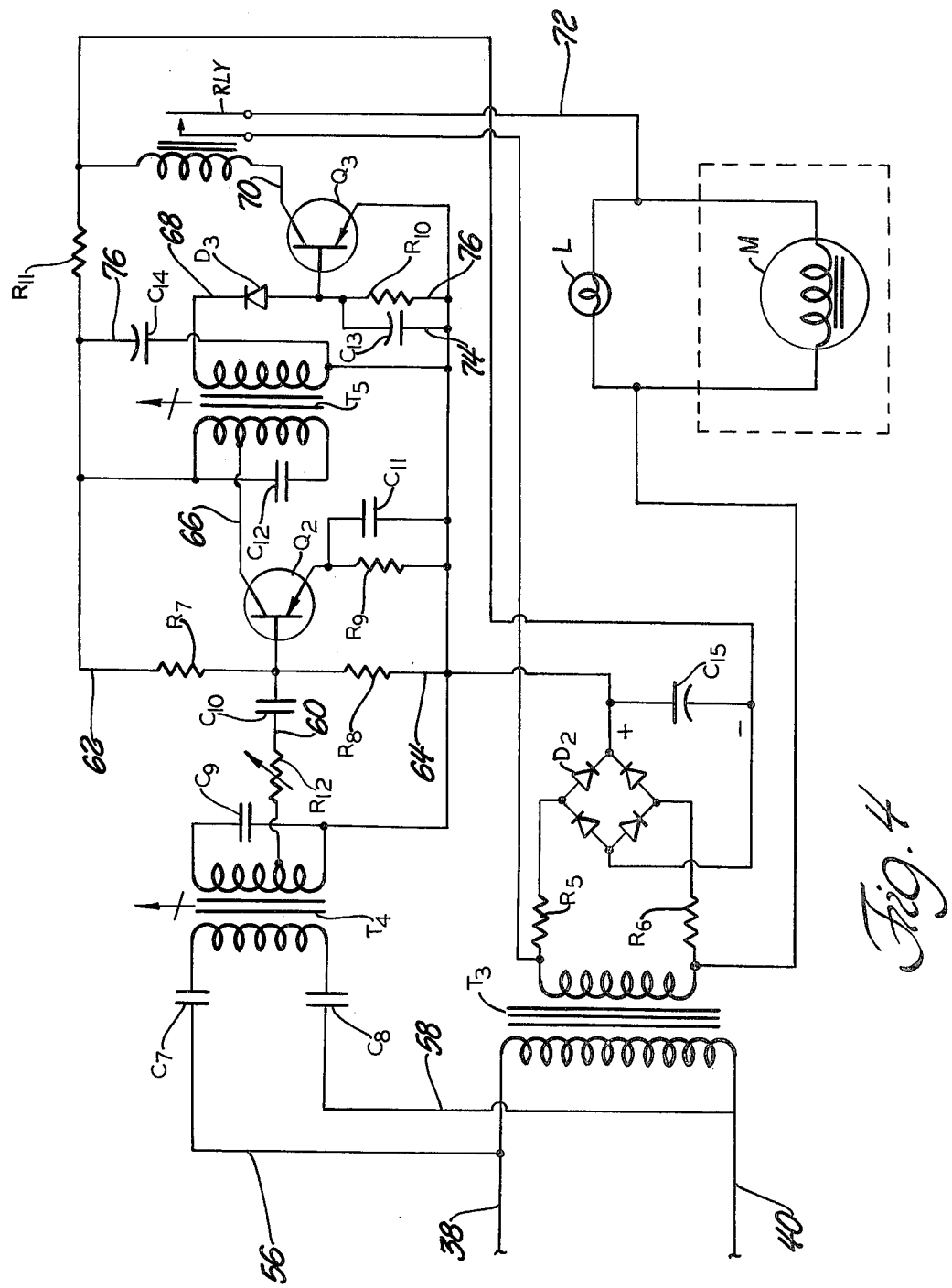
FIG. 4 is a schematic diagram of the receiver circuit and wiring to the humidifier.

FIG. 4 illustrates the remote control receiver and load control circuit arrangement.

A signal received over the A.C. line 38, 40 is capacitively coupled, as by capacitors $C_7$ and $C_8$, again of the 0.1 uf. 250 V. peak type, in lines 56 and 58, to the primary winding of $T_4$, which is a permeability tuned R.F. transformer similar to that of $T_2$ in the transmitter. At 100 $KH_z$ frequency, $C_7$ and $C_8$ present a relatively low impedance to the signal and allow the signal voltage to appear across the primary terminals of $T_4$. $C_7$ and $C_8$ also offer a relatively high impedance at 60 $H_z$ frequency to block the line potential from the primary of $T_4$.

The combination of the secondary of $T_4$ and the transistor $Q_2$ presents an inductively tuned radio frequency amplifier.

The signal from $T_4$ is coupled to the base of transistor $Q_2$ via line 60 through capacitor $C_{10}$, which is of a 500 uuf. 6 V. D.C. rating, and the variable resistor $R_{12}$, which is actually a 30 K Ohm potentiometer. The capacitor $C_{10}$ also acts as a blocking capacitor so as not to upset the D.C. bias voltage at the base of $Q_2$, as relatively fixed by resistors $R_7$ and $R_8$ in the lines 62 and 64, these being of a 47 K Ohm, ⅛ watt and 5.6 K Ohm ⅛ watt resistance, respectively.

The variable resistor $R_{12}$, in line 60, will be appreciated as controlling the gain and serving to stabalize the R.F. amplifier.

The signal output from the collector of $Q_2$ is fed via line 66 to the R.F. of transformer $T_5$, which is a tranformer similar to that of $T_4$. As will be noted and appreciated, the two transformer are permeability (ferrite core) tuned transformers and at 100 $KH_z$ provide rather broadly tuned circuits. Thus, some frequency drift due to heating and aging of the components can be tolerated without adversely affecting the overall operation of the system.

The control function of the receiver is determined by a signal appearing at the base of transistor $Q_3$ via line 68. The diode $D_3$ in line 68 serves to rectify the R.F. signal from the secondary of $T_5$ and this, in turn, results in a ½ cycle pulse that triggers the forward-biased transistor $Q_3$ into a state of steady conduction.

The increase in current flow in the emitter-collector circuit of $Q_3$ serves to energize the coil of the relay RLY via line 70 and thereby causes the associated contacts to close and energize the external load through line 72.

In this particular application the load L is a fractional horsepower 24 V. motor M which operates the humidifier. And to sustain the current flow through $Q_3$, the RC combination of capacitor $C_{13}$ and resistor $R_{10}$, in parallel lines 74 and 76, present a relatively long time constant and fix the forward bias on the base of $Q_3$, to maintain a state of steady conduction.

The biasing of transistor $Q_3$ will be appreciated as analogous to the "gate" action of a silicon controlled rectifier. And, without an incoming signal the receiver is continuously operative and in a quiescent state.

The power supply for the receiver of FIG. 3 will be appreciated as basically the same as that used for the controlling transmitter unit; with the exception that the transformer secondary of $T_5$ provides 24 volts for operation of the external load M.

Current limiting resistors $R_5$ and $R_6$, which are 270 Ohm 2 watt resistors, are added in series with the diode bridge rectifier $D_{2(4)}$.

Resistor $R_{11}$, a 22 K Ohm ¼ watt resistance, and the capacitor $C_{14}$, in line 76, provide additional filtering of the power supply to the R.F. amplifier. And, any ripple appearing at the input of this stage would be amplified and serve to prematurely trigger the control circuit.

While the circuitry shown in FIGS. 3 and 4 represent the prefered form and an operational prototype, the system disclosed and contemplated is not necessarily restricted to these particular circuits.

BRIEF STATEMENT OF OPERATION

With the control box 10, which includes the remote control transmitter and sensing circuitry, located in an area of a house to be served, and plugged into the regular household electrical circuit, and with the receiver circuit in the other control box 24 connected to the humidifier motor, via terminal block 32, and also plugged into the same household electrical circuit, the humidity control system of the present invention is made operational.

The humidity desired is set by the control knob 16 on the transmitter to adjust the sensor A in the transmitter circuit. If a greater amount of humidity is called for, an output signal is inductively coupled via $T_2$ to the household circuit to provide a relatively low impedance fixed frequency signal which is superimposed over the lower frequency signal present in the household circuit lines.

The signal received by the receiver unit, over the household circuit lines connected to it, is amplified and stabalized, as described in the detailed description. The control function of the receiver is dependent on the signal received at the base of the transistor $Q_3$; an increase in current flow in the emittor-collector circuit of $Q_3$ being used to energize the coil of the relay RL4 and to in turn close the circuit to energize the motor in the humidifier in the furnace duct work.

Further refinements in the proposed circuitry, which are within consideration, would include integrated circuits, silicon controlled rectifier uses, transformerless power supplies and having the receiver control unit an integral part of the ultimate assembly—both for the desirable advantage of reducing the physical size of the transmitter and receiver units and for greater simplification in the installation or adaptation for use.

Of principal concern, here and in all further variations, is having the good reliable control of the humidity despite variances in the A.C. line voltages. And this is not and has not been easy to obtain nor has it been readily apparent as to how to best obtain the necessary reliability in the control function with anticipated changes and varations in voltage such as are normal and are normally expected in an A.C. line.

Although not heretofor alway possible, the present design permits close control of the humidity, that is, a reliable setting and/or adjustment, even with the transmitter on one side of the power distribution transformer in a three wire service to a residence, for example, even with the receiver on a circuit which is off the opposite side of the line transformer.

This has been obtained, in part, by having the transistor $Q_1$ in the control transmitter changed from a 6–10 milliwatt output to one with an output signal of 40 M.W. and capable of near 50 M.W. under high line voltage conditions. Also, in the receiver the transistors $Q_2$ and $Q_3$ are similarly capable to a higher output and the resistors $R_5$ and $R_6$ are of the 270 Ohm 2 watt wire wound types, rather than of the 470 Ohm 1 watt metalized resistor types. And, as a consequence, the combination of the higher operating voltages in the receiver and transistor types assures greater sensitivity and the necessary tolerance for A.C. line voltage changes to minimize interferance.

And, finally, for optimum operation controls are best aligned and set precisely at 100 KH$_z$.

We claim:

1. A humidity control system and circuitry, comprising:
    a carrier current transmitter and receiver in combination and for use within a conventional electrical wiring system for a building,
    said transmitter including a step-down transformer and a humidity sensing switching device compactly housed together,
    and said humidity sensing device being provided within the power supply line for said transformer to provide only intermittent actuation thereof for improved sensitivity to humidity demands without having to compensate for temperature rises in an operating transformer closely adjacent thereto.

2. The humidity control system and circuitry of claim 1,
    said transmitter and receiver having an operating frequency of at least half again that of the carrier wiring and without any harmonic interference therewith for providing sufficient sensitivity and reliability for humidifier control use irrespective of normal A.C. line voltage variations.

3. The humidity control system and circuitry of claim 2,
    said transmitter including a tuned collector oscillator with permability adjustment capabilities,
    a power source of A.C. 117 60 H$_z$ and means of connection to said transformer and with one side of said oscillator,
    and modulating circuitry provided between the secondary coil of said transformer and the other side of said oscillator for responsive signal generating use back through said power supply line.

4. The humidity control system and circuitry of claim 3, said receiver including a step-down transformer for connection into the power supply line and a pair of tuned collector oscillators with permability adjustment capabilities for signal receptive connection to said power supply line, and a pair of capacitors in the connecting conductor lines between said power supply line and the first of said oscillators to provide a relatively low impedance for allowing a high frequency signal across the primary of said first oscillator and a relatively high impedance for blocking the lower frequency line potential signal from said primary.

* * * * *